US012645222B2

(12) United States Patent
Zhou et al.

(10) Patent No.: US 12,645,222 B2
(45) Date of Patent: Jun. 2, 2026

(54) AUTONOMOUS OPERATION DEVICE, SYSTEM, AND CONTROL METHOD

(71) Applicant: SHANGHAI SUNSEEKER ROBOTIC TECHNOLOGY CO., LTD., Shanghai (CN)

(72) Inventors: Chang Zhou, Shanghai (CN); Jiangwei Cui, Shanghai (CN)

(73) Assignee: SHANGHAI SUNSEEKER ROBOTIC TECHNOLOGY CO., LTD., Shanghai (CN)

( * ) Notice: Subject to any disclaimer, the term of this patent is extended or adjusted under 35 U.S.C. 154(b) by 332 days.

(21) Appl. No.: 17/913,364

(22) PCT Filed: Jun. 8, 2021

(86) PCT No.: PCT/CN2021/098773
§ 371 (c)(1),
(2) Date: Sep. 21, 2022

(87) PCT Pub. No.: WO2021/249366
PCT Pub. Date: Dec. 16, 2021

(65) Prior Publication Data
US 2023/0141232 A1 May 11, 2023

(30) Foreign Application Priority Data
Jun. 8, 2020 (CN) .......................... 202010510059.0

(51) Int. Cl.
*G05D 1/00* (2006.01)
*A01D 34/00* (2006.01)
*A01D 101/00* (2006.01)

(52) U.S. Cl.
CPC ......... *G05D 1/0276* (2013.01); *G05D 1/0225* (2013.01); *A01D 34/008* (2013.01); *A01D 2101/00* (2013.01)

(58) Field of Classification Search
None
See application file for complete search history.

(56) References Cited

U.S. PATENT DOCUMENTS 7,089,721 B2 * 8/2006 Turner ................. A01D 34/006
56/10.2 A
9,678,507 B1 * 6/2017 Douglas .................. G08G 5/22
(Continued)

FOREIGN PATENT DOCUMENTS

CN 102479358 A * 5/2012
CN 107085417 A 8/2017
(Continued)

OTHER PUBLICATIONS

Extended European Search Report dated May 22, 2024, for European Patent Application No. 21821139.9.
(Continued)

*Primary Examiner* — Redhwan K Mawari
*Assistant Examiner* — Kai Wang
(74) *Attorney, Agent, or Firm* — KARCESKI IP LAW, PLLC

(57) ABSTRACT

A control method for an autonomous operation device includes determining a specified schedule according to a user instruction, and determining a planned schedule according to at least one working area parameter; and comparing the total operation time corresponding to the planned schedule with the total operation time corresponding to the specified schedule. If the total operation time corresponding to the planned schedule is less than the total operation time corresponding to the specified schedule, an operation schedule is determined according to the planned schedule. If the total operation time corresponding to the planned schedule is greater than the total operation time corresponding to the
(Continued)

| Boundary Length $L$ (m) | Number of Starting Points $N$ |
| --- | --- |
| $0 \leq L < 250$ | 1 |
| $250 \leq L < 500$ | 4 |
| $500 \leq L < 750$ | 8 |
| $750 \leq L < 1000$ | 12 | specified schedule, an operation is determined schedule according to the specified schedule.

17 Claims, 2 Drawing Sheets

(56)                References Cited

U.S. PATENT DOCUMENTS

2008/0312821 A1 *  12/2008  Muhlfelder ........ G01C 21/3676
                                                           701/533
2009/0228166 A1 *   9/2009  Durkos ............... G05D 1/0278
                                                           701/26
2011/0166701 A1 *   7/2011  Thacher ................. A01G 25/00
                                                           700/245
2015/0220086 A1 *   8/2015  Willgert .............. A01D 34/008
                                                           701/26
2017/0140311 A1      5/2017  Walker et al.
2018/0077353 A1 *   3/2018  Chen .................. H04N 23/6845

2019/0216014 A1 *   7/2019  Hahn .................... A01D 34/008
2019/0357431 A1 *  11/2019  Kamfors .............. A01D 34/008
2020/0037499 A1 *   2/2020  Ko ........................ A01D 34/008
2020/0173784 A1 *   6/2020  Chang ................. G05D 1/0011
2021/0312722 A1 *  10/2021  Nakashima .......... G06Q 10/047
2021/0352843 A1 *  11/2021  Zhao .................... A01D 34/008

FOREIGN PATENT DOCUMENTS

CN          111123905  A  *   5/2020  .......... G05D 1/0214
EP            3489784  A1      5/2019
JP         2013012003  A  *   1/2013
WO   WO-2013107374  A1  *   7/2013  .......... A01D 34/008
WO   WO-2015142664  A1  *   9/2015  .......... H04L 5/0044
WO   WO-2021012525  A1  *   1/2021  ............. H02J 50/90

OTHER PUBLICATIONS

International Search Report dated Oct. 18, 2021, for International Patent Application No. PCT/CN2021/098773.

* cited by examiner

| Boundary Length $L$ (m) | Number of Starting Points $N$ |
|---|---|
| $0 \leq L < 250$ | 1 |
| $250 \leq L < 500$ | 4 |
| $500 \leq L < 750$ | 8 |
| $750 \leq L < 1000$ | 12 |

FIG. 1

| Boundary Length $L$ (m) | Positions of Starting Points $P$ (m) |
|---|---|
| $0 \leq L < 250$ | 80、160、240 |
| $250 \leq L < 500$ | 80、160、240、320、400、480 |
| $500 \leq L < 750$ | 80、160、240、320、400、480、560、640、720 |
| $750 \leq L < 1000$ | 80、160、240、320、400、480、560、640、720、800、880、960 |

FIG. 2

| Boundary Length $L$ (m) | Positions of Starting Points $P$ (m) |
|---|---|
| $0 \leq L < 250$ | 25、75、125、175 |
| $250 \leq L < 500$ | 100、200、300、400 |
| $500 \leq L < 750$ | 175、350、525、700 |
| $750 \leq L < 1000$ | 200、400、600、800 |

FIG. 3

| Boundary Length $L$ (m) | Operation Schedule | Weekly Operation Time (h) | Operation Start Time to Operation End Time | | | | | | |
|---|---|---|---|---|---|---|---|---|---|
| | | | Sun | Mon | Tue | Wed | Thu | Fri | Sat |
| $0 \leq L < 250$ | 1st Operation Schedule | 10 | N.A. | 9:00~11:00 | 9:00~11:00 | 9:00~11:00 | 9:00~11:00 | 9:00~11:00 | N.A. |
| $250 \leq L < 500$ | 2nd Operation Schedule | 20 | N.A. | 9:00~13:00 | 9:00~13:00 | 9:00~13:00 | 9:00~13:00 | 9:00~13:00 | N.A. |
| $500 \leq L < 750$ | 3rd Operation Schedule | 30 | N.A. | 9:00~15:00 | 9:00~15:00 | 9:00~15:00 | 9:00~15:00 | 9:00~15:00 | N.A. |
| $750 \leq L < 1000$ | 4th Operation Schedule | 40 | N.A. | 9:00~17:00 | 9:00~17:00 | 9:00~17:00 | 9:00~17:00 | 9:00~17:00 | N.A. |

FIG. 4

| Boundary Length $L$ (m) | Operation Schedule | Weekly Operation Time (h) | Duration of Operation (h) | | | | | | |
|---|---|---|---|---|---|---|---|---|---|
| | | | Sun | Mon | Tue | Wed | Thu | Fri | Sat |
| $0 \leq L < 250$ | 1st Operation Schedule | 10 | 0 | 2 | 2 | 2 | 2 | 2 | 0 |
| $250 \leq L < 500$ | 2nd Operation Schedule | 20 | 0 | 4 | 4 | 4 | 4 | 4 | 0 |
| $500 \leq L < 750$ | 3rd Operation Schedule | 30 | 0 | 6 | 6 | 6 | 6 | 6 | 0 |
| $750 \leq L < 1000$ | 4th Operation Schedule | 40 | 0 | 8 | 8 | 8 | 8 | 8 | 0 |

FIG. 5

| | Weekly Operation Time (h) | Operation Start Time to Operation End Time | | | | | | |
|---|---|---|---|---|---|---|---|---|
| | | Sun | Mon | Tue | Wed | Thu | Fri | Sat |
| Planned Schedule | 20 | N.A. | 9:00~13:00 | 9:00~13:00 | 9:00~13:00 | 9:00~13:00 | 9:00~13:00 | N.A. |
| Specific Schedule | 33 | 21:00~24:00 | 9:00~15:00 | 9:00~15:00 | N.A. | 9:00~15:00 | 9:00~15:00 | 9:00~15:00 |
| Operation Schedule A | 20 | 21:00~24:00 | 9:00~15:00 | 9:00~15:00 | N.A. | 9:00~14:00 | N.A. | N.A. |
| Operation Schedule B | 20 | 21:00~22:50 | 9:00~12:38 | 9:00~12:38 | N.A. | 9:00~12:38 | 9:00~12:38 | 9:00~12:38 |

FIG. 6

AUTONOMOUS OPERATION DEVICE, SYSTEM, AND CONTROL METHOD

CROSS-REFERENCE TO RELATED APPLICATION(S)

This is a National Stage Entry into the United States Patent and Trademark Office from International Patent Application No. PCT/CN2021/098773, filed on Jun. 8, 2021, which claims priority to Chinese Patent Application No. 202010510059.0, filed on Jun. 8, 2020, the entire contents of which both of which are incorporated herein by reference.

FIELD OF THE INVENTION

The present invention relates to an autonomous operation device.

BACKGROUND OF THE INVENTION

Various autonomous operation devices have been widely used in people's life, typically such as intelligent sweepers and intelligent lawn mowers, etc. Such an autonomous operation device usually has a moving mechanism, a working mechanism and an automatic control module, so that it can automatically perform operation tasks in a pre-determined working area without human operation. However, the contradiction between the level of intelligence and the cost of the existing autonomous operation device still needs to be resolved. For example, for the determination of a starting point or operation schedule of the autonomous operation device, if it is only configured to use a fixed starting point or operation schedule, or the user is required to manually determine the starting point or operation schedule, although the cost can be reduced, it is difficult to achieve a high level of intelligence, and the user experience will be degraded; if it is configured to automatically adjust the starting point or operation schedule according to the characteristics of the working area, although a higher level of intelligence can be achieved and the user experience can be optimized, complex configurations are required for software and hardware, which increases the production cost and financial burden of user purchases. For the latter, a typical implementation scheme in the prior art is to automatically adjust the operation schedule according to the area of the working area. The area of the working area is usually obtained by configuring a positioning device that satisfies a certain precision combined with complex calculations. For a low-cost autonomous operation device, how to achieve a higher level of intelligence without assembling an expensive high-precision positioning device and/or a high-performance chip is a technical problem to be solved urgently.

SUMMARY OF THE INVENTION

The technical problem to be solved by the present invention is to provide a highly intelligent and low-cost autonomous operation device.

In accordance with a first aspect of the present invention, there is provided a control method for an autonomous operation device, wherein determining a specified schedule according to a user instruction, and determining a planned schedule according to at least one working area parameter; comparing the total operation time corresponding to the planned schedule with the total operation time corresponding to the specified schedule; if the total operation time corresponding to the planned schedule is less than the total operation time corresponding to the specified schedule, determining an operation schedule according to the planned schedule; or if the total operation time corresponding to the planned schedule is greater than the total operation time corresponding to the specified schedule, determining an operation schedule according to the specified schedule.

In an embodiment of the first aspect, wherein if the total operation time corresponding to the planned schedule is less than the total operation time corresponding to the specified schedule, determining the operation schedule according to the total operation time corresponding to the planned schedule and allowable periods corresponding to the specified schedule.

In an embodiment of the first aspect, wherein the operation schedule is determined according to the operation start time and operation end time corresponding to the specified schedule, or according to the operation start time corresponding to the specified schedule and the duration of each allowable period, or according to the operation end time corresponding to the specified schedule and the duration of each allowable period, wherein the operation end time of the last allowable period corresponding to the operation schedule is determined according to the duration of allowable periods corresponding to the planned schedule.

In an embodiment of the first aspect, wherein the total operation time corresponding to the planned schedule is distributed to at least one allowable period corresponding to specified operation schedule randomly or proportionally, and the operation schedule is determined according to the allowable period corresponding to the specified operation schedule and the operation time distributed in the allowable period.

In an embodiment of the first aspect, wherein if the total operation time corresponding to the planned schedule is greater than the total operation time corresponding to the specified schedule, reminder information is sent, the reminder information comprising a reminder that the specified schedule is insufficient and/or the time of the specified schedule is required to be increased.

In an embodiment of the first aspect, wherein when the actual operation time of the current allowable period is less than the duration of the current allowable period corresponding to the operation schedule, the duration difference between the actual operation time of the current allowable period and the duration of the current allowable period corresponding to the operation schedule is at least partially added to at least one subsequent allowable period corresponding to the operation schedule.

In an embodiment of the first aspect, wherein if the duration of the subsequent allowable period corresponding to the specified schedule is less than the duration of the subsequent allowable period corresponding to the operation schedule, reminder information is sent, the reminder information comprising a reminder that the operation time is insufficient and/or the time of the specified schedule is required to be increased.

In an embodiment of the first aspect, wherein the working area parameter is defined as at least one of the boundary length and the size of the working area.

In an embodiment of the first aspect, wherein the number of starting points and/or the positions of starting points are determined according to the working area parameter; and the autonomous operation device enters a working state after arriving at a pre-determined starting point.

In an embodiment of the first aspect, wherein an edge trimming operation is performed when the working area parameter is obtained, or the working area parameter is obtained when the edge trimming operation is performed.

In an embodiment of the first aspect, wherein the working area parameter is re-obtained when a preset third condition is met; and the third condition comprises the time when the autonomous operation device enters a line-following state from the docking station for the first time, and/or reaching the time specified in the operation schedule to start obtaining the working area parameter.

In an embodiment of the first aspect, wherein the number of starting points and/or the positions of starting points are determined according to a preset first relationship; the first relationship comprises a quantitative relationship and a position rule, the quantitative relationship comprises the corresponding relationship between the number of starting points and the working area parameter, the number of starting points is determined according to the quantitative relationship, and the position of each starting point is determined according to the number of starting points and the position rule.

In an embodiment of the first aspect, wherein the number of starting points and/or the positions of starting points are determined according to the preset first relationship; the first relationship comprises a position relationship, and the position relationship comprises a corresponding relationship between the positions of starting points and the working area parameter; and the position of each starting point is determined according to the position relationship.

In an embodiment of the first aspect, wherein after the working area parameter is re-obtained, the number of new starting points are determined according to the quantitative relationship, and the position of each starting point is determined according to the number of new starting points and the position relationship; or the position of each starting point is re-determined according to the position relationship.

In an embodiment of the first aspect, wherein the autonomous operation device is controlled to enter the working state after arriving at the position of a pre-determined starting point; when a preset fifth condition is met, the position of at least one pre-determined starting point is re-determined; and the fifth condition is defined as meeting at least one of the following conditions: completion of the departure from the last starting point; completion of the operation schedule for a specific time; and the cumulative working time reaching the cumulative working time threshold.

In an embodiment of the first aspect, wherein the number of starting points and the positions of starting points are determined according to the preset first relationship; the first relationship comprises a quantitative relationship and a position rule; the quantitative relationship comprises a corresponding relationship between the number of starting points and the working area parameter; and the position rule is changed when the fifth condition is met.

In an embodiment of the first aspect, wherein the positions of starting points are determined according to the preset first relationship; the first relationship comprises a position rule, the position rule comprises a first position rule and a second position rule, and the first position rule is not exactly the same as the second position rule; the positions of starting points are determined according to the first position rule before the fifth condition is met, and the positions of starting points are determined according to the second position rule after the fifth condition is met.

In an embodiment of the first aspect, wherein the number of starting points and/or the positions of starting points are determined according to the preset first relationship; the first relationship comprises a first position relationship and a second position relationship, and the first position relationship is not exactly the same as the second position relationship; the positions of starting points are determined according to the first position relationship before the fifth condition is met, and the positions of starting points are determined according to the second position relationship after the fifth condition is met.

In an embodiment of the first aspect, wherein the number of starting points and/or the positions of starting points are determined according to the preset first relationship; the first relationship further comprises an iteration rule, and the positions of starting points are re-determined according to the iteration rule when the fifth condition is met.

In an embodiment of the first aspect, wherein the position of at least one starting point is randomly re-determined when the fifth condition is met.

In accordance with a second aspect of the present invention, there is provided an autonomous operation device, comprising: an interaction module configured to receive a user instruction, the user instruction comprising a specified schedule; a detection module configured to obtain a working area parameter; and a control module comprising a memory and a processor, the memory storing a computer program executable on the processor, wherein when the processor executes the computer program, the above-mentioned control method for the autonomous operation device can be implemented.

In accordance with a third aspect of the present invention, there is provided an autonomous operation system, comprising a docking station and the above-mentioned autonomous operation device, wherein the docking station is configured to stop the autonomous operation device and supply energy to the autonomous operation device.

In accordance with a fourth aspect of the present invention, there is provided a computer-readable storage medium having a computer program stored thereon, wherein when the computer program is executed by a processor, the above-mentioned control method for the autonomous operation device can be implemented.

BRIEF DESCRIPTION OF THE DRAWINGS

FIG. 1 is a table of data on the quantitative relationship of a specific embodiment of the present invention.

FIG. 2 is a table of data on the position relationship of a specific embodiment of the present invention.

FIG. 3 is a table of data on the position relationship of another specific embodiment of the present invention.

FIG. 4 is a table of correspondence between the operation schedule and the boundary length of a specific embodiment of the present invention.

FIG. 5 is a table of correspondence between the operation schedule and the boundary length of another embodiment of the present invention.

FIG. 6 is a table of planned schedule, specified schedule and operation schedule of a specific embodiment of the present invention.

DETAILED DESCRIPTION OF EMBODIMENT(S) OF THE INVENTION

The present invention will be described in detail below in connection with the specific embodiments shown in the accompanying drawings. However, these embodiments do not limit the invention, and structural, methodological, or functional changes made by those skilled in the art in accordance with these embodiments are included in the scope of protection of the invention.

It is to be understood that in the description of specific embodiments of the present invention, the term "first", "second" and so like are used for descriptive purposes only and are not to be understood as indicating or implying relative importance, order or as implicitly specifying the number of technical features indicated. Thus, a feature qualified with "first", "second" and so like may explicitly or implicitly include one or more of these features.

In specific embodiments of the invention, unless otherwise expressly specified and limited, the terms "connected" and so like are to be understood in a broad sense, for example, as fixed or movable connections, as detachable connections, or as integral parts; they may be directly or indirectly through an intermediate medium; it can be a connection within two elements or an interaction between two elements. For those skilled in the art, the specific meaning of the above terms in the context of the present invention can be understood in the light of the specific circumstances.

In specific embodiments of the invention, unless otherwise expressly specified and limited, the first feature "on" or "under" the second feature may include direct contact between the first and second features, or it may include contact between the first and second features not directly but through another feature between them. The first and second features may also be in direct contact with each other, or the first and second features may not be in direct contact with each other, but in contact with each other through a separate feature.

In specific embodiments of the present invention, unless otherwise expressly specified and limited, the term "a(n)" does not limit the number of features to one.

This embodiment provides an autonomous operation system, including an autonomous operation device, a docking station and a boundary.

The autonomous operation device is especially a robot that can autonomously move in a preset area and perform a specific operation, typically such as an intelligent sweeper/vacuum cleaner for a cleaning operation, or an intelligent lawn mower for a mowing operation. The specific operation especially refers to an operation of processing a working surface and changing the state of the working surface. The present invention takes the intelligent lawn mower as an example for detailed description. The autonomous operation device can autonomously walk on the surface of a working area, and especially the intelligent lawn mower can autonomously mow grass on the ground. The autonomous operation device includes at least a main body mechanism, a moving mechanism, a working mechanism, an energy module, a detection module, an interaction module, a control module, etc.

The main body mechanism generally includes a chassis and a housing. The chassis is used to install and accommodate functional mechanisms and functional modules such as the moving mechanism, the working mechanism, the energy module, the detection module, the interaction module, and the control module. The housing is generally configured to at least partially cover the chassis, and mainly plays a role in enhancing the aesthetics and identification of the autonomous operation device. In this embodiment, the housing is configured to translatable and/or rotatable relative to the chassis under the action of an external force, and cooperates with a suitable detection module, such as a Hall sensor, to further sense collision, lifting and other events.

The moving mechanism is configured to support the main body mechanism on the ground and drive the main body mechanism to move on the ground, and generally includes a wheeled moving mechanism, a crawler or half-crawler moving mechanism, and a walking moving mechanism. In this embodiment, the moving mechanism is a wheeled moving mechanism, including at least one driving wheel and at least one walking prime mover. The walking prime mover is preferably an electric motor, and may also be an internal combustion engine or a machine that generates power by means of other types of energy in other embodiments. In this embodiment, a left driving wheel, a left walking prime mover driving the left driving wheel, a right driving wheel and a right walking prime mover driving the right driving wheel are preferably provided. In this embodiment, the straight travel of the autonomous operation device is realized by the same-direction equal-speed rotation of the left and right driving wheels, and the turning travel is realized by the same-direction differential speed or opposing-direction rotation of the left and right driving wheels. In other embodiments, the moving mechanism may further include a turning mechanism independent of the driving wheels and a turning prime mover independent of the walking prime movers. In this embodiment, the moving mechanism further includes at least one driven wheel, the driven wheel(s) is typically configured as a caster(s), and the driving wheels and the driven wheel(s) are respectively located at the front and rear ends of the autonomous operation device.

The working mechanism is configured to perform specific operation tasks, and includes working parts and a working prime mover that drives the working parts to run. Exemplarily, for an intelligent sweeper/vacuum cleaner, the working parts include a roller brush, a dust absorption pipe, a dust collection chamber, etc.; for an intelligent lawn mower, the working parts include a cutting blade or a cutter disc, and further include other components for optimizing or adjusting the mowing effect, such as a height adjustment mechanism for adjusting the mowing height. The working prime mover is preferably an electric motor, and may also be an internal combustion engine or a machine that generates power by means of other types of energy in other embodiments. In some other embodiments, the working prime mover and the walking prime mover are configured as the same prime mover.

The energy module is configured to provide energy for various functions of the autonomous operation device. In this embodiment, the energy module includes a battery and a charging connection structure, the battery is preferably a rechargeable battery, and the charging connection structure is preferably a charging electrode that can be exposed to the outside of the autonomous operation device.

The detection module is configured as at least one sensor that senses environmental parameters to which the autonomous operation device is exposed or its own working parameters. Typically, the detection module may include sensors related to the limitation of the working area, such as magnetic induction, collision, ultrasonic, infrared, and radio sensors, and the types of sensors are adapted to the positions and number of corresponding signal generating devices. The detection module may further include sensors related to positioning and navigation, such as a GPS positioning device, a laser positioning device, an electronic compass, an acceleration sensor, an odometer, an angle sensor, and a geomagnetic sensor. The detection module may further include sensors related to its own work safety, such as an obstacle sensor, a lifting sensor, and a battery pack temperature sensor. The detection module may further include sensors related to the external environment, such as an environmental temperature sensor, an environmental humidity sensor, a light sensor, and a rain sensor.

The interaction module is configured to at least receive control instruction information input by users, send out information that needs to be perceived by users, communicate with other systems or devices to send and receive information, etc. In this embodiment, the interaction module includes an input device arranged on the autonomous operation device for receiving control instruction information input by users, typically such as a control panel and an emergency stop button; the interaction module further includes a display screen, an indicator light and/or a buzzer arranged on the autonomous operation device for enabling the user to perceive information by lighting and/or sounding. In other embodiments, the interaction module includes a communication module arranged on the autonomous operation device and a terminal device independent of the autonomous operation device, such as a mobile phone, a computer, or a network server, and the user's control instruction information or other information can be input on the terminal device and arrive at the autonomous operation device via a wired or wireless communication module.

The control module generally includes at least one processor and at least one non-volatile memory, the memory stores a pre-written computer program or instruction set, and the processor controls the movement, working and the like of the autonomous operation device according to the computer program or instruction set. Further, the control module can also control and adjust corresponding behaviors of the autonomous operation device, modify the parameters in the memory, and the like according to the signals of the detection module and/or user's control instructions.

The boundary is used to confine the working area of the robotic system, and generally includes an outer boundary and an inner boundary. The autonomous operation device is confined to move and work within the outer boundary, outside the inner boundary, or between the outer boundary and the inner boundary. The boundary may be physical, typically such as a wall, a fence, or a railing; the boundary may also be virtual, typically such as virtual boundary signals sent by a boundary signal generating device, and the virtual boundary signals are usually electromagnetic signals or optical signals, or for the autonomous operation device provided with a positioning device (such as a GPS), the boundary is a virtual boundary set in an electronic map exemplarily formed by two-dimensional or three-dimensional coordinates. In this embodiment, the boundary is configured as a closed-loop energized wire electrically connected to a boundary signal generating device, and the boundary signal generating device is typically arranged within the docking station.

The docking station is generally configured on or within the boundary for the autonomous operation device to be docking, and is in particular able to supply energy to the autonomous operation device electrical connected with the docking station.

The autonomous operation device generally includes a power-on state and a power-off state. In the power-on state, the main switch of the autonomous operation device is turned on, and the control module is powered on; and in the power-off state, the main switch of the autonomous operation device is turned off, and the control module is powered off. Generally, the autonomous operation device is configured in the power-off state during transportation and long-term storage. The power-on state further includes a working state, an idle state and a line-following state. The autonomous operation device can only be in one of the working state, the idle state or the line-following state at the same time, and the control module controls the switching of the autonomous operation device between the working state and the idle state according to an operation schedule, and the switching to the line-following state between the working state and the idle state. In the working state, the autonomous operation device moves and operates within a preset area, and both the moving mechanism and the working mechanism operate; in the idle state, the autonomous operation device stops at an initial position, both the moving mechanism and the working mechanism do not operate, the initial position is generally a position when the autonomous operation device is stopped at the docking station, and at this time, the docking station can supply energy to the autonomous operation device; and in the line-following state, the autonomous operation device moves and searches for the boundary or moves along the boundary, and generally in the line-following state, the moving mechanism operates but the working mechanism does not operate. The operation schedule is usually defined in the unit of a first cycle, and the autonomous operation device periodically ends the working state or starts the idle state according to the operation schedule. Generally, the first cycle is divided into a plurality of time units evenly, and the operation schedule includes a schedule of working within each time unit. As a most general embodiment, the time unit is defined as a natural day, usually starting at 0:00 and ending at 24:00; the first cycle is defined as a natural week (including seven natural days), usually starting at 0:00 on Monday and ending at 24:00 on Sunday, or starting at 0:00 on Sunday and ending at 24:00 on Saturday. Exemplarily, the operation schedule may include a first cycle operation time, an operation start time and operation end time of an allowable period, the duration of the allowable period, etc.

The autonomous operation device in the idle state ends the idle state when the first condition is met, for example by reaching the operation starting time specified in the operation schedule, by completing charging within the allowable period specified in the operation schedule, or by receiving a user instruction of forcibly starting an operation, and then the autonomous operation device enters the line-following state, leaves the docking station, moves along the outer boundary in a first direction to a preset starting point, ends the line-following state, enters the working state, turns towards the working area, leaves the outer boundary, moves in the working area and mows grass. When the autonomous operation device in the working state ends the working state when a second condition is met, for example, by reaching the operation end time specified in the operation schedule, by the battery being low and requiring charging, by the rain sensor being triggered, or by receiving a user instruction of forcibly ending the operation, and then the autonomous operation device enters the line-following state, finds the outer boundary, moves along the outer boundary in a second direction to the docking station, ends the line-following state, and starts the idle state. The first direction is opposite to the second direction. The first direction is exemplarily defined as a clockwise direction, and the second direction is exemplarily defined as a counterclockwise direction. In this embodiment, the ending of the idle state can be triggered by the operation start time, and the ending of the working state can be triggered by the operation end time.

In this embodiment, the line-following state may further include a first line-following state and a second line-following state. In the first line-following state, the autonomous operation device moves and searches for the boundary and moves along the boundary once reaches a specific position near the boundary, the moving target is usually a starting point or the docking station, and in the first line-following state, the moving mechanism operates but the working mechanism does not operate; and in the second line-following state, the autonomous operation device moves along the boundary for a whole circumference, that is, starts from any initial position on the boundary and moves back to the vicinity of the initial position along the boundary, and automatically obtains a working area parameter. In this specific embodiment, the working area parameter is defined as a boundary length L; in other embodiments, the working area parameter may be defined as a size of the working area; and in other embodiments, the working area parameter may also be defined as including the boundary length L and/or the size of the working area. The autonomous operation device is configured to start the second line-following state when meeting a third condition and automatically obtain the boundary length L. Preferably, the autonomous operation device may also display the value of the boundary length L to the user through the interaction module, for example, display the value of the boundary length L on the display screen, or transmit the value of the boundary length L to the terminal device through the communication module and display the value on the terminal device. When the boundary includes only the outer boundary, the boundary length L is equal to the length of the outer boundary. When the boundary includes the outer boundary and the inner boundary, the boundary length L is equal to the length of the outer boundary in some embodiments, and the boundary length L is equal to the difference between the length of the outer boundary and the length of the inner boundary in other embodiments. In this embodiment, the autonomous operation device starts the second line-following state from the docking station and moves along the outer boundary until reaching the vicinity of the docking station again, the moving distance of the autonomous operation device is recorded, and the moving distance is the boundary length L. In this embodiment, the moving distance may be obtained by the detection module assembled on the autonomous operation device, and the detection module is preferably an odometer. In other embodiments, the moving distance may also be obtained by the product of the perimeter of the wheeled moving mechanism and the number of revolutions, wherein the number of revolutions of the wheeled moving mechanism may be exemplarily collected by an encoder, or may also be calculated by a positioning device (such as a GPS module, a laser positioning module, or a UWB positioning module), or may also be obtained by other methods well known to those skilled in the art. In this embodiment, the third condition may include that the autonomous operation device enters the line-following state from the docking station for the first time, where the first time generally refers to the first time after the user purchases the autonomous operation device, or the first time after the autonomous operation device is reset. Specifically, when the user starts the autonomous operation device for the first time, and the autonomous operation device is located at the docking station, the autonomous operation device leaves the docking station and then moves along the outer boundary until arriving at the vicinity of the docking station again, and the moving distance of the autonomous operation device is recorded and stored. In this embodiment, the third condition may further include reaching the time specified in the operation schedule to start obtaining the boundary length. Generally, the operation schedule includes periodically obtaining the boundary length L, for example, the end time of the first idle state every week is the time to start obtaining the boundary length. By periodically obtaining the boundary length L, the previously stored boundary length L can be corrected. Typically, after the user adjusts the range of the working area, the adjusted boundary length L can be obtained in time. In this embodiment, when the autonomous operation device detects a specific signal sent by the docking station in the line-following state, it is determined that the autonomous operation device has arrived at the vicinity of the docking station. In other embodiments, when the autonomous operation device detects a collision event in the line-following state, it is determined that the autonomous operation device has arrived at the vicinity of the docking station. As a further preferred embodiment, when the autonomous operation device is configured in the second line-following state, both the moving mechanism and the working mechanism operate, and the boundary length L can be obtained while an edge trimming operation being performed, that is, the grass at the edge of the working area can be trimmed. Therefore, in this further preferred embodiment, the second line-following state may also be referred to as an edge trimming state.

Exemplarily in the specific scenario, the working area is enclosed by the outer boundary to form an area A, an area B and an area C, and two ends of the area C are connected to the area A and the area B respectively. The area A and the area B both have larger dimensions and can be referred to as regular areas; and the area C has a smaller dimension, is typically defined as a narrow passage having a width not greater than a preset width, and can be referred to as a narrow passage area, where the preset width is generally 0.8 m to 1.2 m.

For the autonomous operation device that follows a random path, because the autonomous operation device in the working state will turn away from the boundary at a random angle after encountering or crossing the boundary during the movement, and the width of the entrance of the narrow passage area is much smaller than the length of the outer boundary of the regular area, the autonomous operation device is less possible to enter the narrow passage area in the working state, even if it enters the narrow passage area, it is difficult to leave the narrow passage area due to random steering, and it is more difficult to smoothly pass through the narrow passage area from one regular area to another regular area. The prior art proposes to set starting points in each regular area to solve the above problem. For example, at least one starting point is set in the area A, and at least one starting point is set in the area B. If the autonomous operation device currently selects a starting point in the area A to enter the working state, then selects a next starting point in turn to enter the working state after meeting a fourth condition, and selects a second next starting point in turn to enter the working state after meeting the fourth condition again, and finally the autonomous operation device starts from the outer boundary of the area A and the area B respectively, to complete the coverage of the entire working area. The fourth condition is usually configured to be entering or ending the idle state, that is, moving from the docking station every time to a different starting point from the last time to enter the working state. In other embodiments, the fourth condition may be a periodic time specified by the operation schedule. However, the setting of the starting point usually requires user intervention.

In order to make the setting of the starting point more intelligent and reduce user's burden, in an embodiment of the present invention, the autonomous operation device is configured to determine the number of starting points N and/or the positions of starting points P according to the boundary length L. Specifically, after obtaining the boundary length L, the autonomous operation device determines the number of starting points N and the positions of starting points P according to a preset first relationship. In principle, the number of starting points N is positively related to the boundary length L, that is, the larger the boundary length L, the larger the number of starting points N. Generally, the positions of starting points P are represented by a boundary interval length between the starting point and the docking station. For example, the autonomous operation device starts from the docking station and moves 5 m along the boundary to the first starting point, which is referred as the position of the first starting point P=5 m. Of course, for the autonomous operation device that can obtain position coordinates, the positions of starting points P may also be represented by two-dimensional or three-dimensional coordinates.

The first relationship may include a quantitative relationship, and the quantitative relationship may include a corresponding relationship between the number of starting points N and the boundary length L. In a preferred embodiment, the relationship between the number of starting points N and the boundary length L may be stored in the control module (specifically, a non-volatile memory) in the form of a data table, and the number of starting points N is determined by looking up the table, as shown in FIG. 1. In other embodiments, the relationship between the number of starting points N and the boundary length L may also be stored in the control module in the form of a function $N=f(L)$, and the number of starting points N is determined by calculation. In this preferred embodiment, the first relationship may further include a position rule, and the position of each starting point P may be determined according to the preset position rule. The position rule will be described in detail below.

Based on the quantitative relationship and the position rule, in a preferred embodiment, the position rule includes at least a first position rule and a second position rule that are not exactly same. The autonomous operation device is configured to be able to re-determine the position of at least one starting point when meeting a fifth condition, that is, if the starting position P of the current starting point is determined according to the first position rule, then when the fifth condition is met later, the starting position P of a next starting point is determined according to the second position rule, wherein the first position rule and the second position rule are not exactly same. Exemplarily, in a specific embodiment, the boundary length L is 400 m. According to FIG. 1, it can be determined that the number of current starting points N is 4. According to the first position rule, the boundary interval length between the position of the initial starting point and the starting point adjacent in the first direction is $a_1$; and except the initial starting point, the boundary interval length between any starting point and the starting point adjacent is $a_2$. Then it is determined that the positions of the four starting points are sequentially $a_1$, $a_1+b_1$, $a_1+2b_1$ and $a_1+3b_1$. Exemplarily, the autonomous operation device enters the working state after moving the distance $a_1$ from the docking station along the boundary for the first time, enters the working state after moving the distance $a_1+b_1$ from the docking station along the boundary for the second time, enters the working state after moving the distance $a_1+2b_1$ from the docking station along the boundary for the third time, and enters the working state after moving the distance $a_1+3b_1$ from the docking station along the boundary for the fourth time. If the fifth condition is still not met, the position of the starting point begins from $a_1$ again, that is, the autonomous operation device enters the working state after moving the distance $a_1$ from the docking station along the boundary for the fifth time, enters the working state after moving the distance $a_1+b_1$ from the docking station along the boundary for the sixth time, and so on. Once the autonomous operation device meets the fifth condition, according to the second position rule, the boundary interval length between the position of the initial starting point and its adjacent starting point in the first direction is $a_2$; and except the initial starting point, the boundary interval length between any starting point and its adjacent starting point is $b_2$. Then it is determined that the positions of the four starting points are sequentially $a_2$, $a_2+b_2$, $a_2+2b_2$ and $a_2+3b_2$. Wherein $a_1$, $a_2$, $b_1$, and $b_2$ may have any value according to the design requirements, as long as it is not simultaneously met that $a_1$ is equal to $a_2$ and $b_1$ is equal to $b_2$. In order to reduce the consumption of computing resources, usually $a_1$ is equal to $b_1$ and $a_2$ is equal to $b_2$. In some embodiments, the fifth condition may be the completion of starting from the last starting point. In some embodiments, the fifth condition may be the completion of the operation schedule of the x day or the x week, where x is a positive integer. In some embodiments, the fifth condition may be that the accumulated working time reaches a certain threshold.

In this embodiment, the quantitative relationship may be the relationship between the numerical range of the boundary length L and a single value of the number of starting points N as shown in FIG. 1, or may be the relationship between the numerical range of the boundary length L and the value range of the number of starting points N. In the latter case, the specific value of the number of starting points N may be selected within the value range of the number of starting points N according to certain rules, or may be randomly selected within the value range of the number of starting points N. Under the guidance of the technical solution described in this description, those skilled in the art can easily determine a specific value solution according to actual needs.

Based on the quantitative relationship and the position rule, in this embodiment, after the autonomous operation device re-obtains the boundary length L, the number of starting points N is firstly determined according to the quantitative relationship. If the number of starting points N does not change, the positions of the starting points continue to be determined according to the position rule or the iteration rule described below. If the number of starting points N changes, the positions of the starting points are re-determined, and on this basis, the positions of the starting points are adjusted according to the position rule or the iteration rule described below.

The first relationship may further include a position relationship, and the position relationship may include a corresponding relationship between the positions of starting points P and the boundary length L. In a preferred embodiment, the relationship between the positions of starting points P and the boundary length L may be stored in the control module (specifically, a non-volatile memory) in the form of a data table, and the positions of starting points P may be determined by looking up the table, as shown in FIG. 2 and FIG. 3, where FIG. 2 exemplarily lists a position relationship, and in this position relationship, corresponding to different boundary lengths L, the positions of starting points L are the same, but the numbers of starting points N are different; and FIG. 3 exemplarily lists another position relationship, and in this position relationship, corresponding to different boundary lengths L, the positions of starting points P are different, but the numbers of starting points N are the same (that is, the number of starting points is unrelated with the boundary length L).

Based on the position relationship, in a preferred embodiment, the position relationship includes at least a first position relationship and a second position relationship that are not exactly same. The first position relationship and the second position relationship may be stored in the control module in the form of two stored data tables, and the positions of starting points P may be determined by looking up the tables. Exemplarily, in a specific embodiment, the control module of the autonomous operation device stores at least the first position relationship data table shown in FIG. 2 and the second position relationship data table shown in FIG. 3, the boundary length L is 400 m, it is determined according to the first position relationship that the positions of starting points are sequentially 80 m, 160 m, 240 m, 320 m, 400 m and 480 m, and when the fifth condition is met, it is determined according to the second position relationship that the positions of starting points are sequentially 100 m, 200 m, 300 m and 400 m.

Based on the position relationship, in this embodiment, after the autonomous operation device re-obtains the boundary length L, the positions of starting points are firstly determined according to the position relationship. If the number of starting points N does not change, the positions of the starting points continue to be determined according to the iteration rule described below. If the number of starting points N changes, the positions of the starting points are re-determined, and on this basis, the positions of the starting points are adjusted according to the iteration rule described below.

Based on the above-mentioned quantitative relationship and position rule, or the above-mentioned position relationship, in another preferred embodiment, the first relationship further includes an iteration rule, that is, an iteration parameter Z is defined, the positions of current starting points are denoted as $P_n$, the positions of starting points after the fifth condition is met are $P_{n+1}$, then $P_{n+1}=g(P_n, Z)$. Preferably, $P_{n+1}=P_n+Z$. Exemplarily, the boundary length L is 450 m, if the positions of the current starting points are sequentially 100 m, 200 m, 300 m and 400 m, and the value of the iteration parameter Z is 40 m, then when the fifth relationship is met, the positions of the starting points are sequentially 140 m, 240 m, 340 m and 440 m; when the fifth relationship is met again, the positions of the starting points are sequentially 180 m, 280 m, 380 m and 480 m, where the boundary interval length represented by the position of the last starting point has exceeded the boundary length L, a boundary length L should be subtracted until the boundary interval length represented by the position of the starting point is not greater or less than the boundary length L, so the positions of the modified starting points are sequentially 180 m, 280 m, 380 m and 30 m. In some embodiments, the positions of starting points can be iterated all the time as described above. In other embodiments, if the boundary interval length represented by the position of a starting point exceeds the boundary length L, the position of the starting point is re-determined from the data table, and further preferably, different iteration parameters Z are selected for iteration. In some embodiments, the value of the iteration parameter Z may be negative. In some embodiments, $P_{n+1}=i \cdot P_n+j \cdot Z$, where i and j are fixed parameters or random parameters within a certain range. In some embodiments, $P_{n+1}=i \cdot P_n \cdot Z+j$, where i and j are fixed parameters or random parameters within a certain range. In some embodiments, the iteration parameter Z may be a random number, or a random number within a certain value range. Under the guidance of the technical solution described in this description, those skilled in the art can easily determine the iteration rule according to actual needs. Under the guidance of the technical solution described in this description, those skilled in the art can easily determine the specific iteration process according to actual needs. For example, the positions of starting points within a period of time can be determined according to the iteration rule before an operation starts, or the position of a next starting point can be determined according to the iteration rule when the next starting point needs to be determined.

In some embodiments, exemplarily, due to the small size of the working area or other reasons, only one starting point is set, then the autonomous operation device is configured to randomly determine the position of a starting point again when the fifth condition is met.

With the above technical solution, regardless of whether the autonomous operation device has the ability to identify narrow passage areas and quickly pass through the narrow passage areas, the autonomous operation device can arrive at all regular areas and narrow passage areas within a certain time, and work in these areas. Of course, the above technical solution is not limited to the autonomous operation device that travels at random. For an autonomous operation device that follows a regular path (such as a straight round-trip path or a spiral path), the above technical solution can also achieve the effect of improving the mowing coverage.

In one embodiment of the present invention, the autonomous operation device is configured to adjust the operation schedule according to the boundary length L. Specifically, the autonomous operation device obtains a boundary length L to obtain an obtained value of the boundary length L, compares the obtained value of the boundary length L with the stored value of the boundary length L stored in the control module, stores the obtained value in the control module as a new stored value if the obtained value is not equal to the stored value, and adjusts the operation schedule according to a preset second relationship. In principle, the total operation time in the first cycle is positively related to the boundary length L, that is, the larger the boundary length L, the longer the total operation time in the first cycle. The total operation time refers to a cumulative duration when the autonomous operation device is in the working state within a certain period of time. The second relationship includes a corresponding relationship between the boundary length L and at least two operation schedules, wherein at least two of the at least two operation schedules are not exactly same. In a preferred embodiment, the second relationship may be stored in the control module in the form of a data table, and an operation schedule may be determined by looking up the table.

In some embodiments, as shown in FIG. 4, each allowable period in the operation schedule is defined by an operation start time and an operation end time. For example, if the boundary length L obtained by the autonomous operation device is 400 m, the operation schedule of the autonomous operation device is determined according to the data corresponding to the second operation schedule in FIG. 4. Specifically, the autonomous operation device ends the idle state at 9:00 every Monday to Friday, and ends the working state at 13:00; within the allowable period, that is, within 9:00~13:00, if the autonomous operation device detects that it needs to be charged, it automatically temporarily ends the working state and returns to the docking station for charging; and if the charging is completed prior to 13:00, it automatically ends the idle state, otherwise it remains in the idle state until 9:00 the next day. After the boundary length L is re-obtained, which operation schedule is to be used is firstly determined according to the second relationship. If the operation schedule to be used remains unchanged, the operation continues according to the original operation schedule; and if the operation schedule to be used changes, the operation is performed according to the new operation schedule. For example, if the boundary length L re-obtained by the autonomous operation device becomes 800 m, the operation schedule of the autonomous operation device is determined according to the data corresponding to the fourth operation schedule in FIG. 4.

In other embodiments, as shown in FIG. 5, the difference from the embodiment described on the basis of FIG. 4 is that the operation schedule defines the duration of the operation. For example, if the boundary length L obtained by the autonomous operation device is 400 m, the operation schedule of the autonomous operation device is determined according to the data corresponding to the second operation schedule in FIG. 5. Specifically, if an allowable period per day is further defined, and the operation start time of each allowable period is the same and is 9:00, the autonomous operation device ends the idle state at 9:00 every Monday to Friday, and the autonomous operation device is allowed to end the idle state within 4 hours from 9:00, but not allowed to end the idle state beyond the 4 hours. From the teachings described above, those skilled in the art can adjust one or more parameters such as weekly operation time, operation start time, operation end time or allowable operation time, etc. according to actual needs.

The autonomous operation device described in this embodiment can automatically select and work according to the most suitable operation schedule without any setting, so low cost and high intelligence are achieved. However, this fully automatic setting of the operation schedule cannot meet individual needs of all users. For some users, they still wish to adjust the operation schedule according to their own situations. In an embodiment of the present invention, the autonomous operation device is configured to obtain a planned schedule according to the boundary length L; if a total work time of a first cycle corresponding to the planned schedule is less than a total work time of a first cycle corresponding to a specified schedule set by the user, determine an operation schedule according to the total work time of the first cycle corresponding to the planned schedule; if the total work time of the first cycle corresponding to the planned schedule is greater than the total work time of the first cycle corresponding to the specified schedule, determine an operation schedule according to the total work time of the first cycle corresponding to the specified schedule; or if the total work time of the first cycle corresponding to the planned schedule is equal to the total work time of the first cycle corresponding to the specified schedule, arbitrarily determine an operation schedule according to the total work time of the first cycle corresponding to the planned schedule or the total work time of the first cycle corresponding to the specified schedule, where the two bases usually achieve the same result, so they will not be discussed separately below.

In a specific embodiment, the control module of the autonomous operation device is preset with a second relational data table exemplarily shown in FIG. 4, that is, under the condition that the autonomous operation device is started for the first time after the user buys it without any settings, or the autonomous operation device is started for the first time after being reset without any settings, the autonomous operation device determines a planned work time (exemplarily the operation start time to the operation end time as listed in FIG. 4) in each time unit according to the information in FIG. 4 and the method described above, and the autonomous operation device is allowed to end the idle state within the planned work time. Further, reaching the start time (exemplarily the operation start time listed in FIG. 4) of the planned work time usually triggers the autonomous operation device to end the idle state, and reaching the end time (exemplarily the operation end time listed in FIG. 4) of the planned work time usually triggers the autonomous operation device to end the working state. In this embodiment, the total operation time (exemplarily the weekly operation time as listed in FIG. 4) of the first cycle is usually the optimal data obtained by the design manufacturer of the autonomous operation device through a large number of tests and calculations, that is, the operation according to the optimal total operation time of the first cycle can ensure the best mowing effect, avoid insufficient lawn mowing due to insufficient operation time, and also avoid lawn damage due to excessive operation time.

In this embodiment, the user can make personalized modifications to the operation start time and/or the operation end time by means of the interaction module. Exemplarily, the autonomous operation device executes the second operation schedule listed in FIG. 4. The autonomous operation device automatically obtains a planned schedule from 9:00 to 11:00 every Monday to Friday according to the boundary length L, where the total operation time per week (i.e., the weekly operation time) corresponding to the planned schedule is hours. In a preferred embodiment, the specified schedule is input by the user through the interaction module for the time that the user believes the autonomous operation device can work, and this method is generally applicable to the situation that the user can confirm that the working time is too less. In another preferred embodiment, the specified schedule is input by the user through the interaction module for the time that the user believes the autonomous operation device cannot work, and this method is generally applicable to the situation that the user can confirm that the working time is too much. After the user inputs the specified schedule, the autonomous work device compares the weekly operation time corresponding to the planned schedule with the weekly operation time corresponding to the specified schedule.

If the weekly operation time corresponding to the planned schedule is less than the weekly operation time corresponding to the specified schedule, the autonomous operation device is configured to determine the operation schedule according to the weekly operation time corresponding to the planned schedule and the allowable period corresponding to the specified schedule. With reference to FIG. 6, in an optional embodiment, the autonomous operation device is further configured to determine an operation schedule A according to the operation start time and operation end time corresponding to the specified schedule, or according to the operation start time corresponding to the specified schedule and the duration of each allowable period, or according to the operation end time corresponding to the specified schedule and each duration of the allowable period, where in the operation schedule A, the operation end time of the last allowable period is automatically determined by the autonomous operation device according to the remaining duration of the allowable period corresponding to the planned schedule, that is, the autonomous operation device performs an operation according to the allowable period corresponding to the specified schedule, and when the accumulated duration of allowable periods reaches the weekly operation time corresponding to the planned schedule, the ending of the working state is triggered and maintained until the operation start time of the next week. In another optional embodiment, the autonomous operation device is further configured to distribute the total operation time corresponding to the planned schedule to at least one allowable period corresponding to the specified operation schedule randomly or according to a corresponding proportion, and determine an operation schedule B according to the allowable period corresponding to the specified schedule and an operation time distributed in the allowable period. Preferably, in this embodiment, the weekly operation time corresponding to the planned schedule is distributed to each allowable period according to a corresponding proportion, and the corresponding proportion is a ratio of the duration of any allowable period corresponding to the specified schedule to the weekly operation time corresponding to the specified schedule, for example, the allowable period corresponding to the specified schedule on Monday is 6 h, the weekly operation time corresponding to the specified schedule is 33 h, then the corresponding proportion is 6/33. Then the allowable operation time on Monday in the operation schedule is $$20\,h \times \frac{6}{33} = 3.6\,h.$$

As a further preferred embodiment, the autonomous operation device is further configured to end the idle state later or end the working state early due to some reasons such as rain or receiving a temporary instruction from the user within the current allowable period. As a result, the actual operation time of the current allowable period is less than the duration of the current allowable period corresponding to the operation schedule. If the duration of the allowable period corresponding to the specified schedule is greater than the duration of the allowable period corresponding to the operation schedule, the duration difference is added as compensation to at least one subsequent allowable period corresponding to the operation schedule, where the duration difference is defined as subtracting the actual operation time of the allowable period from the duration of the allowable period corresponding to the operation schedule. Taking the operation schedule B shown in FIG. 6 as an example, if no actual operation is performed at 21:00~22:50 due to rain on Sunday, the duration of the allowable period corresponding to the operation schedule is 110 minutes, the actual operation time is 0, then the duration difference is 110 minutes, and the 110 minutes is added as compensation to the subsequent operation schedule, for example, the following allowable period corresponding to the operation schedule on Monday is 9:00~14:28, which ensures that the total operation time will not be reduced due to the reasons such as rain or receiving a temporary instruction from the user, and fully ensures the mowing effect of the lawn. Under the guidance of the technical solution disclosed in this description, those skilled in the art can easily determine other compensation strategies according to actual needs, for example, add the duration difference in a corresponding proportion to each allowable operation period corresponding to the operation schedule after the current first cycle, or add the duration difference to the operation schedule in the next first cycle. If the duration of the allowable period corresponding to the subsequent specified schedule is less than the duration of the allowable period corresponding to the operation schedule, the interaction module may remind the user that the duration difference can be compensated by temporarily adjusting the specified schedule (typically by temporarily increasing at least one allowable operation period). If the user agrees to temporarily adjust the specified schedule, the duration difference can be added in the corresponding allowable period for compensation according to the specified schedule parameters input by the user, or the limit of the specified schedule is automatically broken in the next one or more allowable operation periods, and the operation start time is appropriately advanced and/or the operation end time is appropriately delayed to compensate for the duration difference. After the duration difference is compensated, the operation continues according to the original operation schedule. If the user does not agree to temporarily adjust the specified schedule, the duration difference will no longer be compensated.

If the weekly operation time corresponding to the planned schedule is greater than the weekly operation time corresponding to the specified schedule, it indicates that if the operation schedule is determined according to the specified schedule, there will be insufficient operation time, resulting in insufficient lawn mowing and trimming. At this time, the autonomous operation device is configured to send reminder information to the user to remind the user to increase the length of the specified schedule. If the user increases the length of the specified schedule, the previous step is performed, to compare the weekly operation time corresponding to the planned schedule with the weekly operation time corresponding to the modified specified schedule. If the user does not increase the length of the specified schedule, the operation schedule is determined according to the specified schedule, so as to ensure that the user's instructions are regarded as priority instructions for execution in principle.

It should be understood that although this description is in accordance with the embodiments, not each embodiment contains only one separate technical solution, and that the description is presented in this way only for the sake of clarity, and that those skilled in the art should take the description as a whole, and that the technical solutions in each embodiment can also be suitably combined to form other embodiments that can be understood by those skilled in the art. Based on the detailed description of the technical solutions and specific embodiments involved in the present description, those skilled in the art will be able to recognize, with the corresponding technical teachings, that the technical solutions of the present invention are not limited to low-cost autonomous operation devices and that the adoption of the technical solutions of the present invention for autonomous operation devices equipped with high-precision positioning devices and/or high-performance chips can significantly reduce the complexity of calculations and help to reduce system resource losses and improve energy efficiency and system stability.

The series of detailed descriptions listed above are only specific descriptions of feasible embodiments of the present invention, they are not intended to limit the scope of protection of the present invention and any equivalent embodiments or modifications that do not depart from the spirit of the art of the present invention shall be included in the scope of protection of the present invention.

The invention claimed is:

1. A control method for an autonomous operation device, comprising:

receiving an instruction from a user via an input device disposed on the autonomous operation device, wherein the instruction comprising comprises a specified schedule set by the user for operation of the autonomous operation device;

obtaining, via a sensor, a boundary length for operation of the autonomous operation device;

storing, in a memory disposed on the autonomous operation device, a computer program executable on a processor connected to the memory and to the input device;

receiving, by the processor, the specified schedule from the user via the input device, wherein the specified schedule encompasses a first duration for operation of the autonomous operation device, wherein the first duration comprises a plurality of first time periods;

determining, by the processor, a planned schedule according to the boundary length, wherein the planned schedule encompasses a second duration for operation of the autonomous operation device, wherein the second duration comprises a plurality of second time periods;

determining, by the processor, at least one of a number of starting points for the autonomous operation device and positions of the starting points for the autonomous operation device according to the boundary length, wherein and the autonomous operation device begins working after arriving at a pre-determined starting point;

comparing, by the processor, the first duration with the second duration; and at least one of if the second duration is less than the first duration, operating the autonomous operation device according to an operation schedule corresponding to the planned schedule; and if the second duration is greater than the first duration, operating the autonomous operation device according to an operation schedule corresponding to the specified schedule.

2. The control method according to claim 1, wherein if the second duration is less than the first duration, the operation schedule encompasses the plurality of first time periods corresponding to the specified schedule.

3. The control method according to claim 2, wherein:

the operation schedule comprises one of a duration between a first operation start time and a first operation end time corresponding to the specified schedule, a duration of each of the plurality of first time periods starting at the first operation start time, or the duration of each of the plurality of first time periods terminating at the first operation end time, and the first operation end time corresponds to a duration of the plurality of second time periods corresponding to the planned schedule.

4. The control method according to claim 2, wherein the second duration is distributed to at least one of the plurality of first time periods, and the operation schedule is determined according to the first duration and a second total operation time distributed to the at least one of the plurality of first time periods.

5. The control method according to claim 1, wherein if the second duration is greater than the first duration, a reminder is generated by the processor, the reminder indicating that the specified schedule is insufficient and/or that the first duration is required to be increased.

6. The control method according to claim 4, wherein when an actual operation time of a current time period is less than a calculated duration of the current time period corresponding to the operation schedule, a difference between the actual operation time of the current time period and the calculated duration of the current time period corresponding to the operation schedule is at least partially added to at least one subsequent time period corresponding to the operation schedule.

7. The control method according to claim 6, wherein if a duration of the subsequent time period corresponding to the specified schedule is less than a duration of the subsequent time period corresponding to the operation schedule, a reminder is generated by the processor, the reminder indicating that the actual operation time is insufficient and/or that the first duration is required to be increased.

8. The control method according to claim 1, wherein the boundary length is re-obtained when a preset third condition is met, wherein the third condition comprises a time when the autonomous operation device enters a line-following state from a docking station for a first time, and/or reaches a predetermined time specified in the operation schedule to reobtain the boundary length.

9. The control method according to claim 1, wherein the number of starting points and/or the positions of the starting points are determined according to a preset first relationship comprising a quantitative relationship between the number of starting points and the boundary length, wherein a position of each starting point is determined at least according to the number of starting points.

10. The control method according to claim 1, wherein the number of starting points and/or the positions of the starting points are determined according to a preset first relationship comprising a position relationship between the positions of starting points and the boundary length, wherein a position of each starting point is determined according to the position relationship.

11. The control method according to claim 1, wherein the autonomous operation device begins working after arriving at a position of at least one pre-determined starting point and, after satisfying a preset fifth condition the position of at least one pre-determined starting point is re-determined, wherein the preset fifth condition comprises at least one of: completion of a departure from the last starting point; completion of the operation schedule for a specific time; and a cumulative working time reaching a cumulative working time threshold.

12. The control method according to claim 11, wherein a number of starting points and positions of the starting points are determined according to a preset first relationship comprising a quantitative relationship and a position rule, wherein the quantitative relationship comprises a corresponding relationship between the number of starting points and the boundary length and the position rule is changed when the preset fifth condition is satisfied.

13. The control method according to claim 11, wherein the positions of starting points are determined according to a preset second relationship comprising a position rule, wherein the position rule comprises a first position rule and a second position rule, the first position rule differing from the second position rule; the positions of starting points are determined according to the first position rule before the preset fifth condition is satisfied, and the positions of starting points are determined according to the second position rule after the preset fifth condition is satisfied.

14. The control method according to claim 11, wherein the number of starting points and/or the positions of starting points are determined according to a preset third relationship comprising a first position relationship and a second position relationship, the first position relationship differing from the second position relationship; the positions of starting points are determined according to the first position relationship before the preset fifth condition is satisfied, and the positions of starting points are determined according to the second position relationship after the preset fifth condition is satisfied.

15. The control method according to claim 12, wherein the number of starting points and/or the positions of starting points are determined according to the preset first relationship, wherein the preset first relationship further comprises an iteration rule, and the positions of starting points are re-determined according to the iteration rule when the fifth condition is satisfied, wherein the preset fifth condition comprises at least one of: completion of a departure from the last starting point; completion of the operation schedule for a specific time; and a cumulative working time reaching a cumulative working time threshold.

16. The control method according to claim 11, wherein the position of at least one pre-determined starting point is randomly re-determined when the fifth condition is satisfied.

17. An autonomous operation system, comprising a docking station and an autonomous operation device, wherein the docking station is configured to stop the autonomous operation device and supply energy to the autonomous operation device, wherein the autonomous operation device operates according to the control method according to claim 1.

* * * * *